(12) United States Patent
Liu et al.

(10) Patent No.: US 8,600,393 B2
(45) Date of Patent: Dec. 3, 2013

(54) METHODS AND APPARATUS FOR ENABLING INTERFERENCE COORDINATION IN HETEROGENEOUS NETWORKS

(75) Inventors: Lingjia Liu, Allen, TX (US); Guowang Miao, Plano, TX (US); Ying Li, Garland, TX (US); Jianzhong Zhang, Plano, TX (US); Young-Han Nam, Richardson, TX (US)

(73) Assignee: Samsung Electronics Co. Ltd., Suwon-Si (KR)

( * ) Notice: Subject to any disclaimer, the term of this patent is extended or adjusted under 35 U.S.C. 154(b) by 58 days.

(21) Appl. No.: 13/250,429

(22) Filed: Sep. 30, 2011

(65) Prior Publication Data

US 2012/0083280 A1    Apr. 5, 2012

Related U.S. Application Data

(60) Provisional application No. 61/389,610, filed on Oct. 4, 2010, provisional application No. 61/391,944, filed on Oct. 11, 2010.

(51) Int. Cl.
  *H04W 40/00*    (2009.01)

(52) U.S. Cl.
  USPC .......... 455/446; 455/63.1; 455/450; 455/574; 455/444; 370/329

(58) Field of Classification Search
  CPC .................................................... H04W 16/14
  USPC ............ 455/450–452.2, 63.1, 446, 41.2, 444, 455/572–574; 370/329, 331
  See application file for complete search history.

(56) References Cited

U.S. PATENT DOCUMENTS

| | | | |
|---|---|---|---|
| 7,415,278 B2 * | 8/2008 | Zhao et al. .................... 455/447 |
| 7,454,218 B2 * | 11/2008 | Mo et al. ....................... 455/502 |
| 7,542,722 B2 * | 6/2009 | Carlsson ...................... 455/63.1 |
| 7,697,896 B2 * | 4/2010 | Maekawa et al. ............ 455/63.1 |
| 8,010,118 B2 * | 8/2011 | Reudink ....................... 455/446 |
| 8,072,929 B2 * | 12/2011 | Frederiksen et al. ......... 370/329 |
| 2011/0149894 A1 * | 6/2011 | Luo et al. ...................... 370/329 |
| 2011/0310878 A1 * | 12/2011 | Lindoff et al. ................ 370/343 |
| 2011/0319025 A1 * | 12/2011 | Siomina et al. ............. 455/63.1 |
| 2012/0069756 A1 * | 3/2012 | Ji et al. .......................... 370/252 |
| 2012/0108177 A1 * | 5/2012 | Miao et al. ................. 455/67.11 |
| 2012/0113850 A1 * | 5/2012 | Fu et al. ......................... 370/252 |
| 2012/0329503 A1 * | 12/2012 | Jongren et al. ............... 455/509 |
| 2013/0114434 A1 * | 5/2013 | Muruganathan et al. ..... 370/252 |

OTHER PUBLICATIONS

International Search Report dated Mar. 19, 2012 in connection with International Patent Application No. PCT/KR2011/007327.

(Continued)

*Primary Examiner* — Sharad Rampuria (57) ABSTRACT

For use in a heterogeneous network, a method for enabling interference coordination includes, upon occurrence of a trigger condition, determining, at a first low power node, that the first low power node is approaching a second low power node. The method also includes sending, at the first low power node, an entering message to an evolved Node-B (eNB) that serves the first low power node. The method further includes receiving, at the first low power node, configuration information from the eNB to perform at least one measurement of the second low power node.

21 Claims, 8 Drawing Sheets

(56) References Cited

OTHER PUBLICATIONS

Written Opinion of International Searching Authority dated Mar. 19, 2012 in connection with International Patent Application No. PCT/KR2011/007327.
Samsung, "Discussion on Static/Dynamic Home eNB ICIC", 3GPP TSG RAN WG1 Meeting #62, R1-104629, Aug. 23-27, 2010, pp. 1-4.
LG Electronics, "Downlink Performance over Heterogeneous Networks", 3GPP TSG RAN WG1 Meeting #62, R1-104662, Aug. 23-27, 2010, 7 pages.
LG Electronics, "Extending Rel-8/9 ICIC for Heterogenous Networks", 3GPP TSG RAN WG1 Meeting #60bis, R1-102430, Apr. 12-16, 2010, pp. 1-4.
Samsung, "Discussion on DL Power Setting for Heterogeneous Networks", 3GPP TSG RAN WG1 Meeting #62, R1-104626, Aug. 23-27, 2010, 10 pages.

* cited by examiner

```
                    OtherConfig INFORMATION ELEMENT
-- ASN1START

OtherConfig-r10 : := SEQUENCE {
reportProximityConfig-r9   ReportProximityConfig-r9   OPTIONAL,   -- Need ON
...
}

ReportProximityConfig-r9 : : = SEQUENCE {
proximityIndicationEUTRA-r10    ENUMERATED {enabled}    OPTIONAL,    -- Need OR
proximityIndicationUTRA-r10     ENUMERATED {enabled}    OPTIONAL     -- Need OR
}

--ASN1STOP
```

FIG. 9

```
                    ProximityFemtoIndication MESSAGE
-- ASN1START

ProximityIndication-r10 : := SEQUENCE {
    criticalExtensions              CHOICE{
        c1                          CHOICE{
            proximityIndication-10          ProximityIndication-r9-IEs,
            spare3 NULL, spare2 NULL, spare1 NULL
            },
        critical ExtensionsFuture   SEQUENCE { }
    }
}

ProximityFemtoIndication-r10-IEs : := SEQUENCE {
    type-r10                    ENUMERATED {entering, leaving},
    CSGtype-r10                 ENUMERATED {On the whitelist, not on the whitelist}
    carrierFreq-r10             CHOICE {
        eutra-r10                   ARFCN-ValueEUTRA,
        utra-r10                        ARFCN-ValueUTRA,
        ...
    },
    nonCriticalExtension        ProximityIndication-v930-IEs                OPTIONAL
}

ProximityIndication-v930-IEs : := SEQUENCE {
    lateR9NonCriticalExtension      OCTET STRING        OPTIONAL,
    nonCriticalExtension            SEQUENCE { }        OPTIONAL
}

--ASN1STOP
```

METHODS AND APPARATUS FOR ENABLING INTERFERENCE COORDINATION IN HETEROGENEOUS NETWORKS

CROSS-REFERENCE TO RELATED APPLICATION(S) AND CLAIM OF PRIORITY

The present application is related to U.S. Provisional Patent Application No. 61/389,610, filed Oct. 4, 2010, entitled "METHODS AND APPARATUS FOR ENABLING INTERFERENCE COORDINATION IN HETEROGENEOUS NETWORKS". Provisional Patent Application No. 61/389,610 is assigned to the assignee of the present application and is hereby incorporated by reference into the present application as if fully set forth herein. The present application hereby claims priority under 35 U.S.C. §119(e) to U.S. Provisional Patent Application No. 61/389,610.

The present application is also related to U.S. Provisional Patent Application No. 61/391,944, filed Oct. 11, 2010, entitled "METHOD AND APPARATUS FOR IMPROVING PUSCH CQI/PMI FEEDBACK". Provisional Patent Application No. 61/391,944 is assigned to the assignee of the present application and is hereby incorporated by reference into the present application as if fully set forth herein. The present application hereby claims priority under 35 U.S.C. §119(e) to U.S. Provisional Patent Application No. 61/391,944.

TECHNICAL FIELD OF THE INVENTION

The present application relates generally to wireless communications and, more specifically, to a method for enabling interference coordination in heterogeneous networks.

BACKGROUND OF THE INVENTION

A heterogeneous network (HetNet) is regarded as one of the enabling technologies for the 3rd Generation Partnership Project (3GPP) to meet the performance requirements set forth in the Long Term Evolution Advanced (LTE-A) standard. HetNet incorporates a set of new nodes with lower transmit power as compared to typical macro evolved Node-Bs (eNBs) in the system. These new nodes (e.g., pico cells, home eNBs, femto cells, relays, and the like) change the topology of the system to a much more heterogeneous nature with a completely new interference environment in which nodes of multiple classes "compete" for the same wireless resources.

SUMMARY OF THE INVENTION

For use in a heterogeneous network, a method for enabling interference coordination is provided. The method includes, upon occurrence of a trigger condition, determining, at a first low power node, that the first low power node is approaching a second low power node. The method also includes sending, at the first low power node, an entering message to an evolved Node-B (eNB) that serves the first low power node. The method further includes receiving, at the first low power node, configuration information from the eNB to perform at least one measurement of the second low power node.

For use in a heterogeneous network, a first low power node capable of interference coordination is provided. The first low power node is configured to, upon occurrence of a trigger condition, determine that the first low power node is approaching a second low power node. The first low power node is also configured to send an entering message to an evolved Node-B (eNB) that serves the first low power node. The first low power node is further configured to receive configuration information from the eNB to perform at least one measurement of the second low power node.

A heterogeneous network configured for interference coordination is provided. The heterogeneous network includes a first low power node, a second low power node, and an evolved Node-B (eNB) that serves the first low power node. The first low power node is configured to, upon occurrence of a trigger condition, determine that the first low power node is approaching the second low power node. The first low power node is also configured to send an entering message to the evolved Node-B (eNB). The first low power node is further configured to receive configuration information from the eNB to perform at least one measurement of the second low power node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

The following documents and standards descriptions are hereby incorporated into the present disclosure as if fully set forth herein:

REV-080052, "LTE-Advanced System Requirements", Qualcomm Europe (hereinafter "REF1");

R1-082556, "New Interference Scenarios in LTE-Advanced", Qualcomm Europe (hereinafter "REF2");

R1-104102, "Performance Evaluation for Power Control based on Femto Deployment", Alcatel-Lucent Shanghai Bell, Alcatel-Lucent (hereinafter "REF3");

R1-103823, "HeNB power setting performance under different access constraints", Nokia Siemens Networks (hereinafter "REF4");

R1-103495, "DL Power Setting in Macro-Femto", CATT (hereinafter "REF5");

3GPP Technical Report No. 36.814, version 9.0.0, "Further advancements for E-UTRA physical layer aspects" (hereinafter "REF6"); and 3GPP Technical Report No. 36.331, "Evolved Universal Terrestrial Radio Access (E-UTRA); Radio Resource Control (RRC); Protocol Specification" (hereinafter "REF7").

In a heterogeneous network (HetNet), disparate types of nodes (e.g., pico cells, home eNBs, femto cells, relays, and the like) may be subject to an interference-prone environment where the nodes compete for the same wireless resources within the HetNet. Some of the interference conditions that arise in such a network are described in REF2. HetNets provide large gains over traditional macro networks, as explained in REF2. However, HetNets also bring more severe interference issues as opposed to those in macro cells, as shown in FIG. 1.

Figure 1:
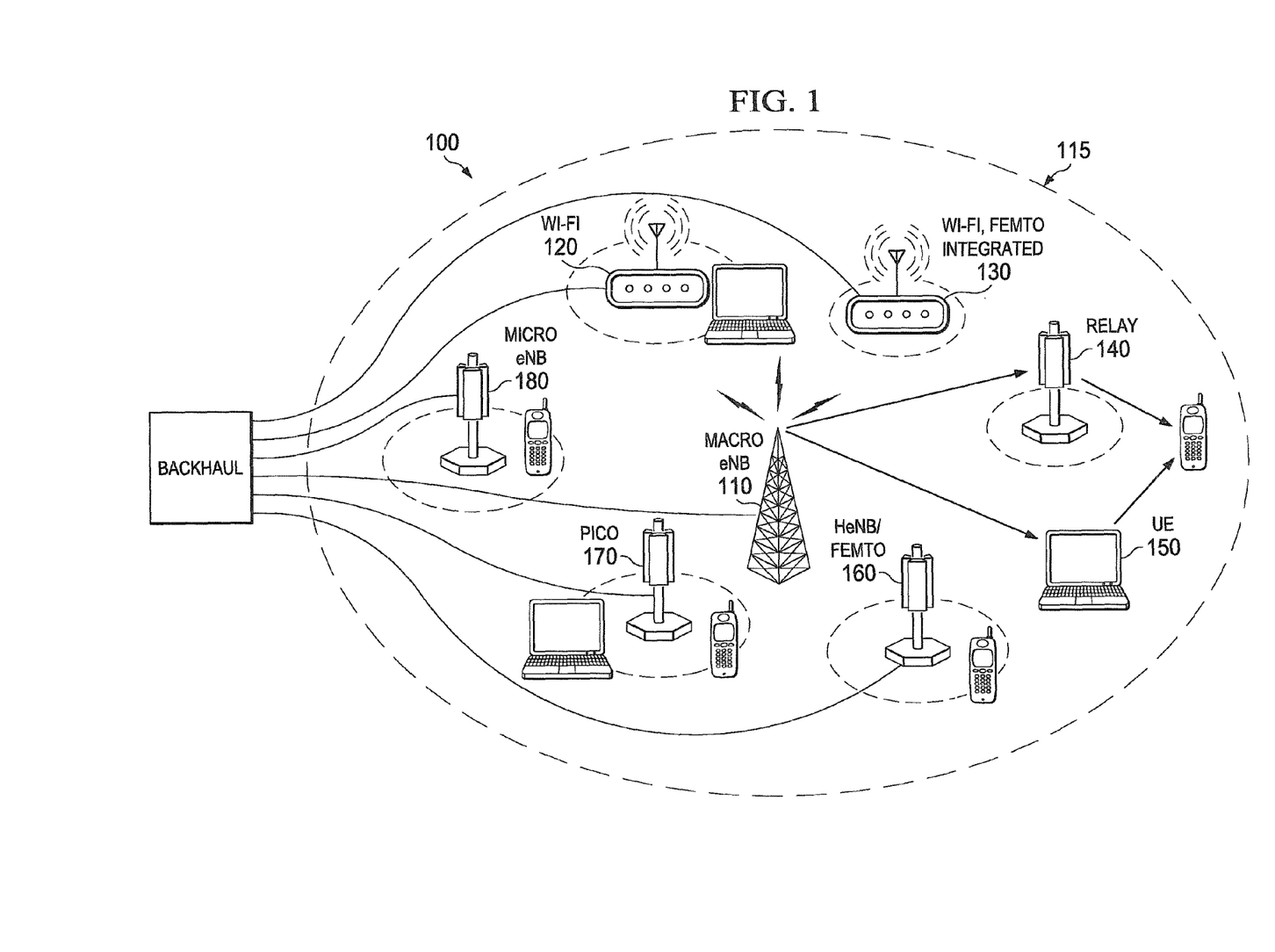
FIG. 1 illustrates a heterogeneous network (HetNet) according to one embodiment of this disclosure.

FIG. 1 illustrates a heterogeneous network according to one embodiment of this disclosure. Heterogeneous network (HetNet) 100 includes a macro eNB 110 that broadcasts over macro network coverage area 115. HetNet 100 also includes a plurality of nodes and networks, including a Wi-Fi network 120, a Wi-Fi femto network 130, a relay node 140, a user equipment (UE) 150, a home eNB (HeNB) femto network 160, a pico network 170, and a micro eNB network 180. Each network 120, 130, 160, 170, 180 includes one or more nodes. The nodes in each network 120, 130, 160, 170, 180 are configured to communicate with at least one other node in their respective networks, and perhaps communicate with nodes in other networks. As suggested in FIG. 1, for in-band transmission where multiple transmission nodes use the same frequency, the spectral efficiency of the transmissions is greatly improved due to the virtual cell splitting gain. However, in certain areas, overall interference is severe due to the fact that many radio technologies are interfering with each other. Therefore, interference mitigation is important for successful HetNet communications.

Due to differences between the low power nodes, different interference mitigation schemes could be applied for each type of low power node. Properties of some types of low power nodes are shown in Table 1 below.

TABLE 1

Properties of Low Power Nodes

| Node Type | Backhaul | Access | Notes |
|---|---|---|---|
| Remote radio head (RRH) | Several μs latency to macro | Open to all UEs | Placed indoors or outdoors |
| Pico eNB (i.e. node for Hotzone cells) | X2 | Open to all UEs | Placed indoors or outdoors. Typically planned deployment. |
| HeNB (i.e. node for Femto Cells) | No X2 as baseline | Closed Subscriber Group (CSG) | Placed indoors. Consumer deployed. |
| Relay nodes | Through air-interface with a macro-cell (for in-band RN case) | Open to all UEs | Placed indoors or outdoors |

For example, if the low power node is a pico cell, which is typically open to all UEs, then techniques utilizing interference coordination (e.g., Inter-Cell Interference Coordination or "ICIC") over the spatial domain (e.g., spatial domain ICIC) and biased handover (e.g., range extension) could be used for interference mitigation. As another example, if the low power node is a HeNB, then the node is typically only open to a closed subscriber group (CSG). Thus, a UE which is not a member of the CSG may encounter interference from the HeNB when the UE is in the vicinity of the HeNB. This characteristic makes interference mitigation for HeNB especially important. The interference scenarios related to a HeNB and CSG can be seen in FIG. 2.

Figure 2:
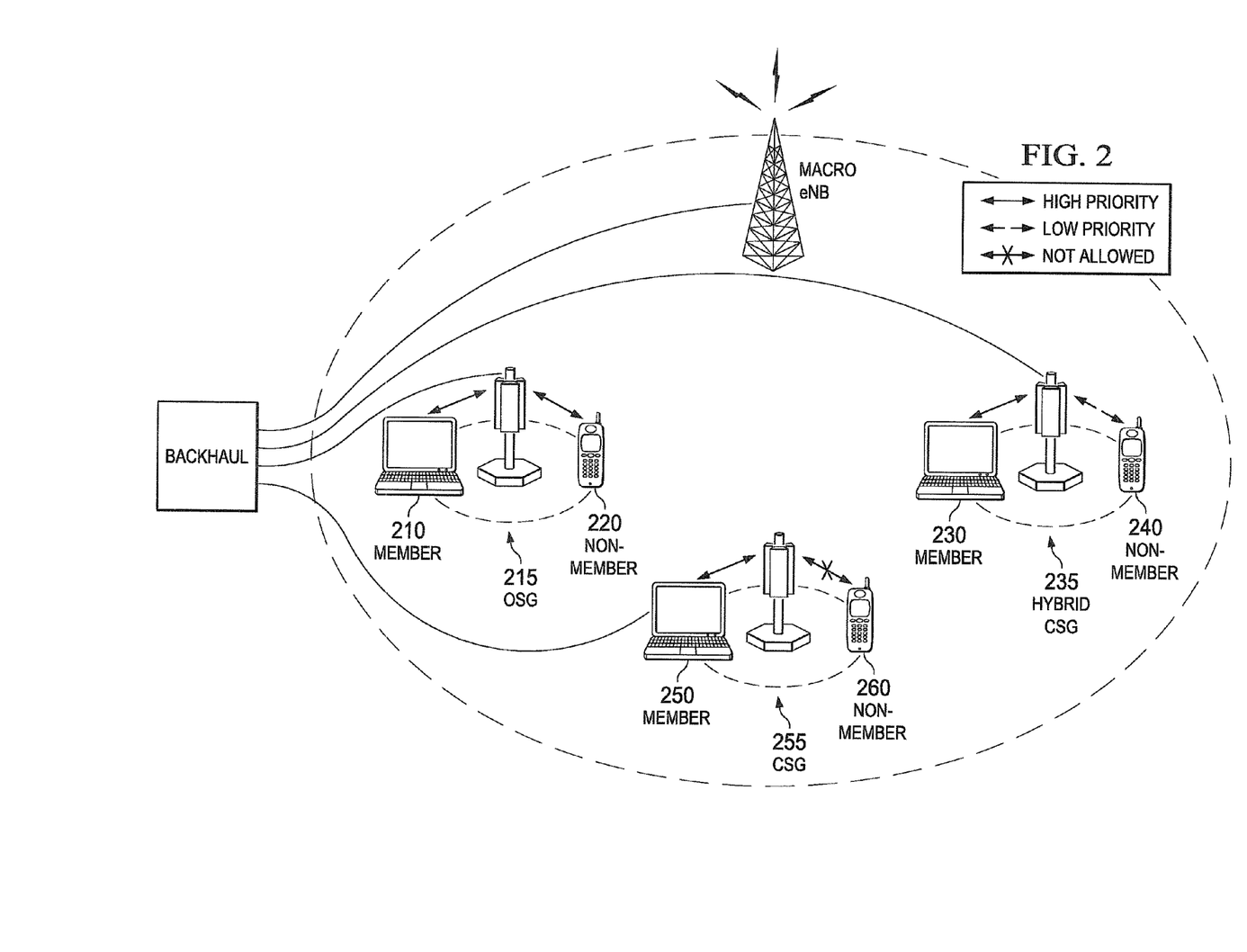
FIG. 2 illustrates interference scenarios for different subscriber groups according to one embodiment of this disclosure.

FIG. 2 illustrates interference scenarios for different subscriber groups according to one embodiment of this disclosure. As shown in FIG. 2, an open subscriber group (OSG) 215 serves both members (e.g., member 210) and non-members (e.g., non-member 220). Examples of OSGs include a pico eNB, a hot zone cell, a relay, and the like. A hybrid CSG 235 serves member UEs (e.g., member 230) with high priority and serves non-member UEs (e.g., member 240) with low priority. Typically, a CSG 255 serves only members (e.g., member 250) and does not serve non-member UEs (e.g., non-member 260). Therefore non-member UEs (e.g., non-member 260) may encounter significant interference from CSG cells such as CSG 255. This can be seen more clearly by looking at the geometry of a macro UE (i.e., a UE communicating on a macro cell) in the presence of a femto cell.

Figure 3:
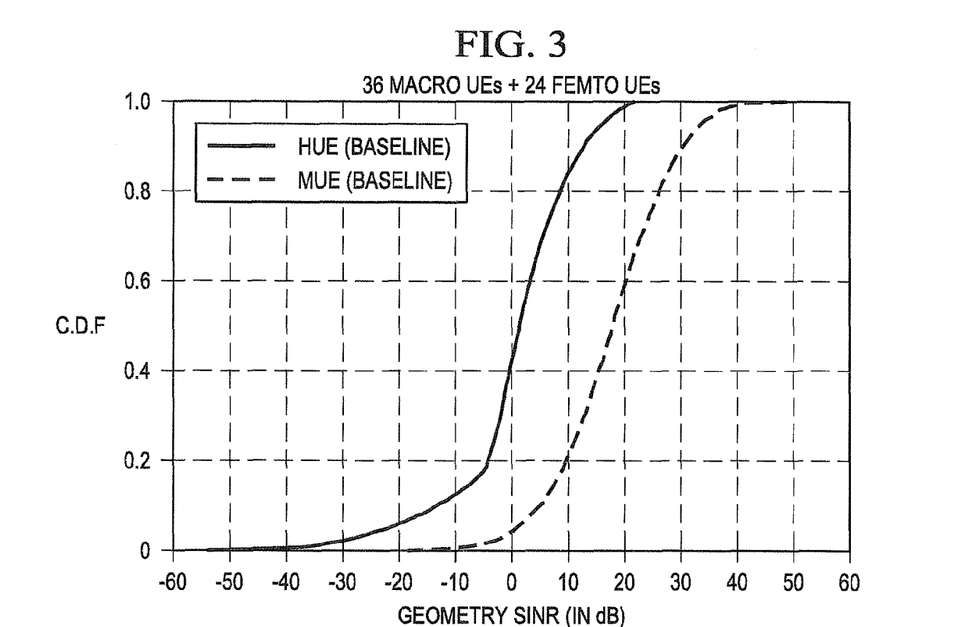
FIG. 3 illustrates a typical macro UE geometry in the presence of a femto closed subscriber group in a macro-femto HetNet.

FIG. 3 illustrates a typical macro UE geometry in the presence of a femto CSG in a macro-femto HetNet (i.e., a HetNet that includes a macro cell and a femto cell). In REF3-REF5, evaluations of the macro UE's geometry are performed under the system assumptions listed in REF6.

The HUE and MUE plots in FIG. 3 suggest that in the presence of a femto CSG, the macro UE's outage ratio (defined to be the ratio of macro UEs whose geometry is below than −6 dB) becomes high. For example, approximately 16% of the macro UEs (MUE) are in outage while only approximately 1% of the HeNB UEs (HUE) are in outage. This suggests that even though a macro-femto (CSG) system could help improve system throughput (supporting more users in the system), the system creates more cell-edge users in the macro cell.

In the 3GPP RAN1 #62 meeting, it was agreed that a time-domain solution (e.g., use of almost blank subframes or "ABSF") and power setting solutions may be applied for macro-femto interference scenarios and that a time-domain solution may be applied for macro-pico interference scenarios. Essentially, these schemes require a femto CSG cell to sacrifice some of its resources for the benefit of non-member macro UEs. Of course, it is preferable for the femto CSG to sacrifice its resources only when a non-member macro UE is in the vicinity. The characteristics of ABSF are known in the art, and a detailed description is omitted here.

On the other hand, even if the eICIC is static, when the non-member macro UE is moving towards the femto CSG, the non-member macro UE may need to perform measurements, such as radio link monitoring (RLM), radio resource management (RRM), or channel state information (CSI) measurement, on restricted resources. Herein, restricted resources may be, e.g., non-ABSF subframes. Therefore, the network still needs to know whether or not the non-member macro UE is approaching a femto CSG.

In this disclosure, a number of methods are described for the network to know whether a non-member macro UE is approaching a femto CSG based on a report from the macro UE.

In an embodiment of this disclosure, a proximity femto indication (PFI) process is defined. The PFI process is implemented to inform the network that a UE (i.e., a macro UE) is approaching a femto CSG cell whose CSG ID is not on the UE's whitelist. Upon receipt of this information, the network can perform either one or both of two operations, depending on whether the network has established an eICIC process between the femto cell and the macro cell. The two actions are described below as a "pre-eICIC operation" and a "post-eICIC operation".

In the pre-eICIC operation, the network requests that the UE report additional detailed measurements from the corresponding CSG cell for the purpose of an eICIC trigger. Herein, the eICIC trigger may be, e.g., the macro cell sending a request to the femto eNB to perform one or more eICIC processes, such as use of time-domain ABSFs and/or power setting adjustments at the femto cell.

In the post-eICIC operation, the network requests that the UE perform one or more measurements for radio link monitoring (RLM), radio resource management (RRM), and/or channel quality indicator (CQI) measurement on the restricted resources.

In one embodiment, the network performs the pre-eICIC operation when the eICIC process has not been initiated between the femto cell and macro cell. This embodiment is applicable for semi-static eICIC between the femto cell and macro cell. In another embodiment, the network performs the post-eICIC operation when the network has already established one or more eICIC processes between the femto cell and macro cell.

In an embodiment where the network has already established an eICIC process between the femto cell and macro cell (e.g., the femto cell has already applied the ABSF configuration and the ABSF configuration is known at the macro cell) (hereafter referred to as a "post-eICIC embodiment"), the proximity femto indication (PFI) process may be represented as a two-step process.

In Step 1, the network configures the UE with PFI control. In Step 2, the UE sends an "entering" PFI when the UE determines that the UE may be near or approaching a CSG cell whose CSG ID is not in the UE's CSG whitelist. Step 1 and Step 2 of the PFI process for a post-eICIC embodiment will now be described in greater detail.

In Step 1 of the PFI process in a post-eICIC embodiment, the network configures the UE with PFI control. In this step, the network, through transmission of a RRCConnectionReconfiguration message, may configure the UE to determine whether or not the PFI is enabled for the cell(s) of the concerned radio access technology (RAT) (in this example, the RAT is a femto cell) whose CSG IDs are not in the UE's CSG whitelist. The network may also configure the UE with a trigger condition for the UE's PFI report. For example, the trigger condition can be based on at least one of the following:
   the reference signal receive power (RSRP) and/or the reference signal receive quality (RSRQ) of the CSG femto eNB's non-ABSFs;
   the RSRP and/or RSRQ of the CSG femto eNB's ABSFs;
   the RSRP and/or RSRQ of the serving macro eNB's non-ABSFs; and
   the RSRP and/or RSRQ of the serving macro's ABSFs.

When a RSFM (restricted subframe for measurement) is defined for the eICIC, the trigger condition can alternatively or additionally be based on at least one of the following:
   the RSRP and/or RSRQ of the UE's RSFMs; and
   the RSRP and/or RSRQ of the UE's non-RSFMs.

As another example, the trigger condition for the UE's PFI report can be one or more previously defined events or modifications to previously defined events, for example, the LTE measurement events A3, A4, and A5. The A3, A4, and A5 events are described in REF1 and are known to those of skill in the art. Accordingly, a detailed description of the A3, A4, and A5 events is omitted here. The A3, A4, and A5 events may be modified according to a number of alternatives, which will now be described.

In a first alternative associated with the A3 and A5 events, the UE takes the measurement on the non-RSFMs of the serving cell as the measurement result of the serving cell. Alternatively or additionally, the UE takes the measurement on the RSFMs of the serving cell as the measurement result of the neighboring non-member CSG cell.

In a second alternative associated with an A4 event, the UE takes the measurement on the RSFM of the serving cell as the measurement result of the neighboring non-member CSG cell.

In a third alternative associated with the A4 and A5 events, different offsets of the A4 and A5 events are defined for the PFI trigger. For example, a definition of the offset for the A4 event and A5 event is:
   for RSRP, a RSRP-based threshold for event evaluation (the actual value is −140 dBm); and
   for RSRQ, a RSRQ-based threshold for event evaluation (the actual value is (−40)/2 dB).
For the purpose of the PFI trigger for eICIC, the RSRP and RSRQ thresholds of the A4 event may be reduced. Alternatively or additionally, the RSRP and RSRQ thresholds for "threshold2" of A5 event may be reduced.

In a fourth alternative, features of the first and third alternatives are combined. That is, in the fourth alternative, different offsets of the A4 and A5 events are defined, and the UE is configured to take the measurement on the RSFMs and non-RSFMs of the serving cell when the RSFMs of the serving is configured and signaled to the UE.

In Step 2 of the PFI process, the UE sends an "entering" PFI to the macro network when the UE determines that the UE may be near or approaching a CSG cell whose CSG ID is not in the UE's CSG whitelist. The determination is based on occurrence of the trigger condition defined above. The PFI includes the RAT and frequency of the cell. When the network receives the "entering" PFI, the network configures the UE to perform measurements for radio link monitor (RLM), radio resource management (RRM), and/or channel state information (CSI) on the RSFM.

The UE sends a "leaving" PFI to the macro network when the UE determines that the UE may be departing from the CSG cell whose CSG ID is not in the UE's CSG whitelist. When the network receives the "leaving" PFI, the network configures the UE to perform measurements according to 3GPP Release 8 principles (e.g., the UE performs RLM/RRM/CSI measurements on all available subframes).

In an embodiment where the network has not initiated an eICIC process between the femto cell and macro cell (e.g., the femto cell has not applied the ABSF configuration and/or power setting) (hereafter referred to as a "pre-eICIC embodiment"), the PFI process may be represented as a two-step process.

In Step 1, the network configures the UE with PFI control. In Step 2, the UE sends an "entering" PFI when the UE determines the UE may be near or approaching a CSG cell whose CSG ID is not in the UE's CSG whitelist. While Steps 1 and 2 of the PFI process for a pre-eICIC embodiment are similar to Steps 1 and 2 of the PFI process for a post-eICIC embodiment, there are differences, which will now be described in greater detail.

In Step 1 of the PFI process in a pre-eICIC embodiment, the network configures the UE with PFI control. In this step, the network, through transmission of a RRCConnectionReconfiguration message, may configure the UE to determine whether or not the PFI is enabled for the cell(s) of the concerned RAT (i.e., the femto cell) whose CSG IDs are not in the UEs' CSG whitelist. The network may also configure the UE with a trigger condition for the UE's PFI report. For example, the trigger condition can be the RSRP and/or RSRQ of the CSG femto cells.

As another example, the trigger condition for the UE's PFI report can be one or more previously defined events or modifications to previously defined events, for example, the LTE measurement events A3, A4, and A5. The A3, A4, and A5 events may be modified according to a number of alternatives, which will now be described.

In a first alternative associated with the A3, A4, and A5 events, the UE takes the measurement on the non-ABSFs of the serving cell when the ABSFs of the serving cell are configured and signaled to the UE. Otherwise, the UE performs the measurement on any subframe.

In a second alternative associated with the A4 and A5 events, different offsets of the A4 and A5 events are defined for the PFI trigger. For example, a definition of the offset for the A4 event and A5 event is for RSRP, a RSRP-based threshold for event evaluation (the actual value is IE value −140 dBm); and for RSRQ, a RSRQ-based threshold for event evaluation (the actual value is (IE value −40)/2 dB).

For the purpose of the PFI trigger for eICIC, the RSRP and RSRQ thresholds of the A4 event may be reduced. Alternatively or additionally, the RSRP and RSRQ thresholds for "threshold2" of A5 event may be reduced.

In a third alternative, features of the first and second alternatives are combined. That is, in the third alternative, different offsets of the A4 and A5 are defined, and the UE takes the measurement on the non-ABSFs of the serving cell when the ABSFs of the serving are configured and signaled to the UE.

In Step 2 of the PFI process, the UE sends an "entering" PFI to the macro network when the UE determines that the UE may be near or approaching a CSG cell whose CSG ID is not in the UE's CSG whitelist. The determination is based on occurrence of the trigger condition defined above. The PFI includes the RAT and frequency of the cell. The UE sends an "leaving" PFI when it determines it may be departing from a CSG cell whose CSG ID is not in the UE's CSG whitelist.

When the network receives the "entering" PFI, the network configures the UE with relevant measurement configuration for RRM so that the UE can perform measurements on the reported RAT and frequency in case a measurement configuration is not present. The configured measurements can be restricted to non-ABSFs of the serving cell if an ABSF configuration is present in the serving cell.

When the network configures UE with relevant measurement configuration, the network performs eICIC coordination between serving cells and neighboring CSG femto cells for the target UE. The eICIC coordination procedure is shown in FIG. 4 for an embodiment where the underlying eICIC scheme is associated with power setting configuration.

Figure 4:
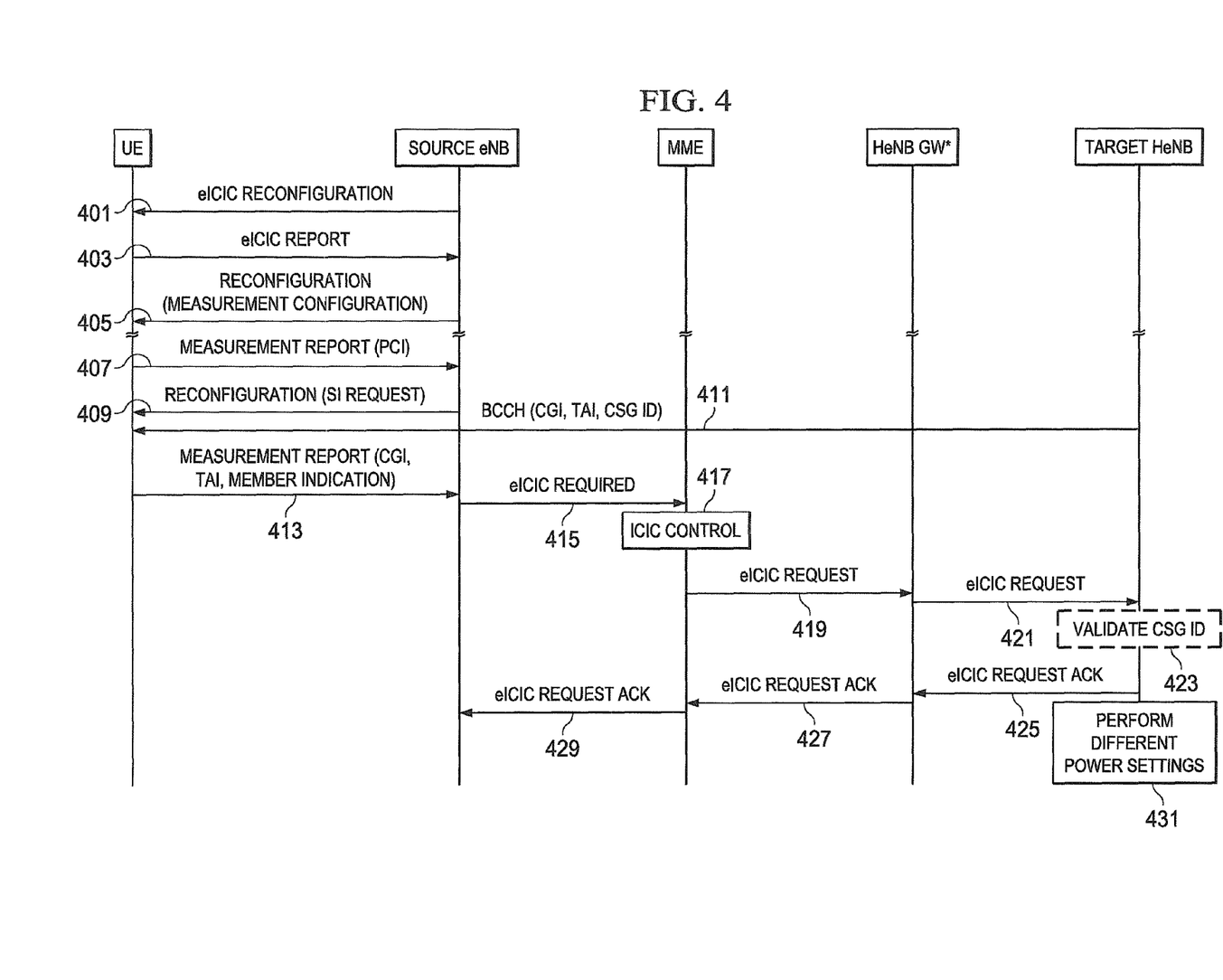
FIG. 4 illustrates a message flow diagram for an Inter-Cell Interference Coordination (eICIC) configuration procedure according to an embodiment of this disclosure.

FIG. 4 illustrates a message flow diagram for an eICIC configuration procedure according to an embodiment of this disclosure. In FIG. 4, the eICIC is associated with a power setting adjustment. For the sake of illustration, FIG. 4 is described with respect to the femto cell/macro cell HetNet interference embodiment described earlier. However, it will be understood that the procedure described in FIG. 4 could be used in other networks as well.

In operation 401, a source eNB (i.e., the macro eNB) sends an eICIC Reconfiguration message to the UE (i.e., the macro UE). In operation 403, the UE responds by sending an eICIC Report to the source eNB. Operations 405-413 are described in at least one of REF1 through REF7, and are known to those of skill in the art. Accordingly, a detailed description of operations 405-413 is omitted here.

In operation 415, the source eNB sends a message to the Mobility Management Entity (MME) that eICIC is required. In operation 417, the MME coordinates ICIC control, which in FIG. 4 is associated with a power setting adjustment. The MME then sends an eICIC Request message to the HeNB gateway (i.e., the gateway for the femto cell) in operation 419. In operation 421, the HeNB gateway sends the eICIC Request message to the HeNB (i.e., the eNB for the femto cell). The HeNB validates the CSG ID of the femto cell in operation 423. In operation 425, the HeNB sends an eICIC Request Acknowledgement (ACK) or negative ACK (NAK) to the HeNB gateway. The HeNB gateway sends the ACK to the MME in operation 427, and the MME sends the ACK to the source eNB in operation 429. In operation 431, the HeNB performs different power settings.

As shown in FIG. 4, operations 415 through 429 reflect new operations of signaling between the Source eNB and the HeNB and between the MME and HeNB gateway for the coordination of the eICIC. Using operations 415 through 429, when the CSG femto cell receives the power setting request from the macro cell, the femto cell sends an ACK or NAK back to the macro cell.

Figure 5:
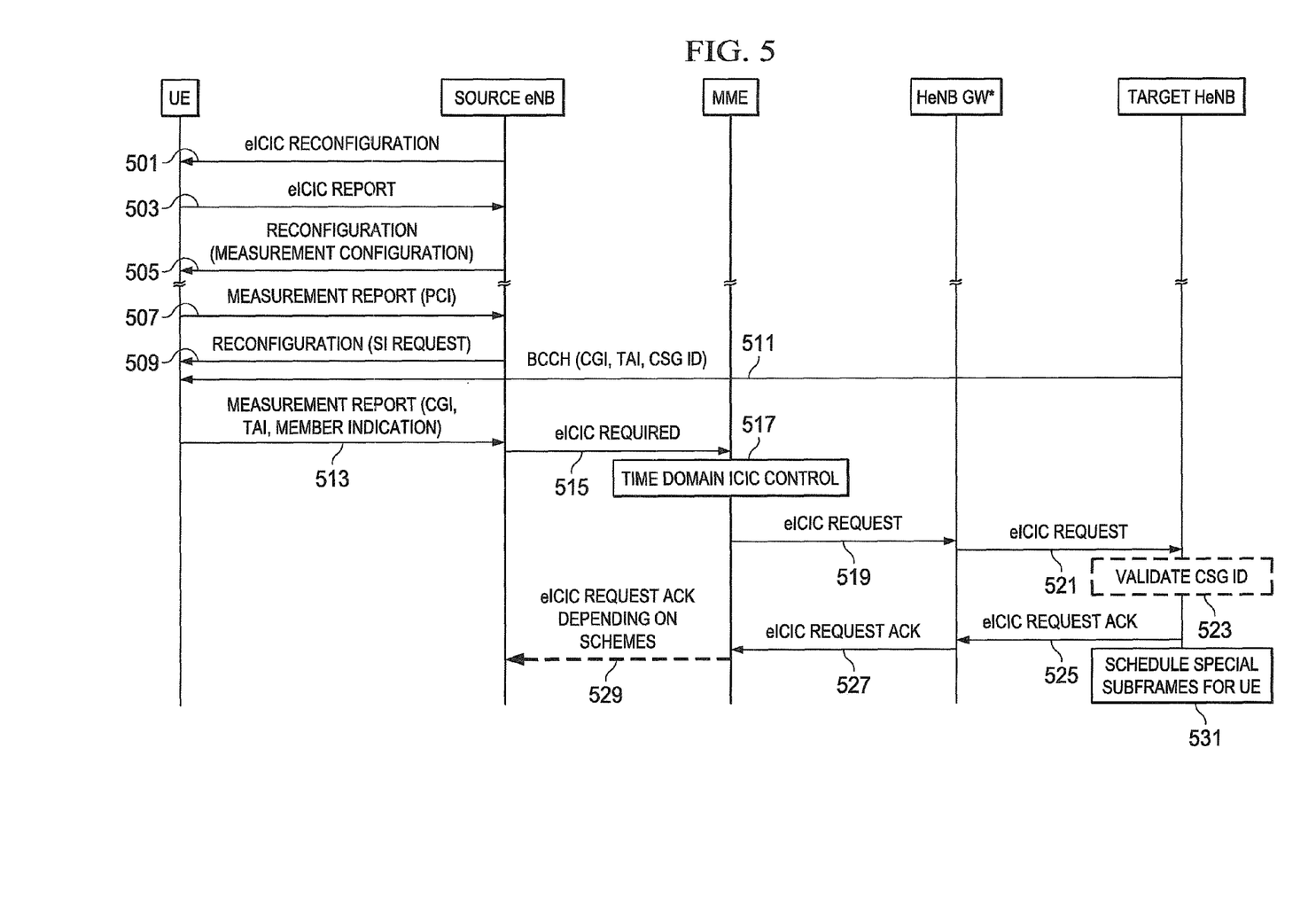
FIG. 5 illustrates a message flow diagram for a corresponding eICIC configuration procedure, according to an embodiment of this disclosure.

FIG. 5 illustrates a message flow diagram for a corresponding eICIC configuration procedure, according to an embodiment of this disclosure. In FIG. 5, the underlying eICIC scheme is a time domain solution, rather than the power setting scheme shown in FIG. 4. For the sake of illustration, FIG. 5 is also described with respect to the femto cell/macro cell HetNet interference embodiment described earlier. However, it will be understood that the procedure described in FIG. 5 could be used in other networks as well.

As shown in FIG. 5, operations 501 through 531 are the same as or substantially similar to the corresponding operations 401-431 in FIG. 4, except for the following differences.

In operation 517, the MME coordinates time domain ICIC control, which may include configuring an ABSF pattern. In an alternative embodiment, the time domain ICIC control is coordinated at the HeNB gateway, instead of the MME. In operation 531, the HeNB schedules special subframes for the UE according to the ABSF pattern.

For eICIC triggering based on a time-domain solution, as shown in FIG. 5, the ABSF pattern to be used at the neighboring CSG femto cell may depend on both the eICIC request and the femto cell's own traffic conditions. That is, the network entity that coordinates the ABSF pattern to be used at the CSG femto cell (e.g., the MME or HeNB gateway) may use messages or reports from both the macro cell and the femto cell to make a decision.

In some embodiments, upon receiving the "leaving" PFI, the network (i.e., the macro cell) sends an "eICIC release" message to the femto CSG cell(s) in order to release the eICIC resources.

In another embodiment of this disclosure, a new strong macro interference indication (SMI) process is defined. The SMI process is implemented to inform the network that a pico UE is approaching a macro cell. In contrast to the PFI process that is implemented when a macro UE receives interference from a femto CSG cell, the SMI process is implemented in embodiments where the UE is communicating in a pico network and interference is caused by a macro cell.) Upon receipt of this information, the network can request the pico UE to perform one or more measurements for radio link monitoring (RLM), radio resource management (RRM), and/or channel quality indicator (CQI) measurement on the restricted resources for better performance.

The SMI process is performed when an eICIC process has already been established between the pico cell and macro cell. That is, the macro cell is configured to apply ABSF patterns for the benefit of the pico cell.

In an embodiment where the network has already established a static eICIC process between the pico cell and macro cell (e.g., the macro cell has already applied the ABSF configuration and the ABSF configuration is known at the pico cell), the strong macro interference indication (SMI) process may be represented as a two-step process.

In Step 1, the network configures the UE with SMI control. In Step 2, the UE sends an "entering" SMI when the UE determines that the UE may be near or approaching a macro cell. Step 1 and Step 2 of the SMI process will now be described in greater detail.

In Step 1, the network configures the UE with SMI control. In this step, the network, through transmission of a RRCConnectionReconfiguration message, may configure the UE to determine whether or not the SMI is enabled for the cell(s) of the concerned RAT (in this example, the RAT is a macro cell). The network may also configure the UE with a trigger condition for the UE's SMI report. For example, the trigger condition can be based on at least one of the following:
 the RSRP and/or RSRQ of the macro cell's non-ABSFs; and
 the RSRP and/or RSRQ of the macro cell's ABSFs.

When a RSFM (restricted subframe for measurement) is defined for the eICIC, the trigger condition can alternatively or additionally be based on at least one of the following:
 the RSRP and/or RSRQ of the UE's RSFMs; and
 the RSRP and/or RSRQ of the UE's non-RSFMs.

As another example, the trigger condition for the UE's SMI report can be one or more previously defined events or modifications to previously defined events, the LTE measurement events A3, A4, and A5.

In a first alternative associated with the A3 and A5 events, the UE takes the measurement on the non-RSFMs of the serving cell as the measurement result of the serving cell. Alternatively or additionally, the UE takes the measurement on the RSFMs of the serving cell as the measurement result of the neighboring cell.

In a second alternative associated with an A4 event, the UE takes the measurement on the RSFM of the serving cell as the measurement result of the neighboring cell.

In a third alternative associated with the A4 and A5 events, different offsets of the A4 and A5 events are defined for the SMI trigger. For example, a definition of the offset for the A4 event and A5 event is:
 for RSRP, a RSRP-based threshold for event evaluation (the actual value is −140 dBm); and
 for RSRQ, a RSRQ-based threshold for event evaluation (the actual value is (−40)/2 dB).

For the purpose of the SMI trigger for eICIC, the RSRP and RSRQ thresholds of the A4 event may be reduced. Alternatively or additionally, the RSRP and RSRQ thresholds for "threshold2" of A5 event may be reduced.

In a fourth alternative, features of the first and third alternatives are combined. That is, in the fourth alternative, different offsets of the A4 and A5 events are defined, and the UE is configured to take the measurement on the RSFMs and non-RSFMs of the serving cell when the RSFMs of the serving is configured and signaled to the UE.

In Step 2 of the SMI process, the UE sends an "entering" strong macro interference indication when the UE determines that the UE may be near or approaching a macro cell. The strong macro interference indication includes the RAT and frequency of the cell. When the network receives the "entering" strong macro interference indication, the network configures the UE to perform measurements for radio link monitor (RLM), radio resource management (RRM), and/or channel state information (CSI) on the RSFM.

The UE sends a "leaving" strong macro interference indication to the network when the UE determines that the UE may be departing from the macro cell. When the network receives the "leaving" strong macro interference indication, the network configures the UE to perform measurements according to 3GPP Release 8 principles (e.g., the UE performs RLM/RRM/CSI measurements on all available subframes).

In another embodiment of this disclosure, a joint eICIC/handover (HO) configuration and report procedure is defined. In this embodiment, the UE reports to the network whether the UE is "entering" or "leaving" a CSG cell and whether the corresponding CSG femto cell is on UE's whitelist or not based on trigger conditions. Upon receiving the report, the network may request the UE to report more detailed system information from the CSG for the eICIC trigger. Additionally or alternatively, the network may request the UE to perform measurement for radio link monitoring (RLM), radio resource management (RRM), and/or CQI measurement on the restricted resource.

In an embodiment, the network sends an eICIC trigger to the corresponding CSG femto cell. If the UE is "entering" a CSG where the CSG is on the whitelist of the corresponding UE, the network may configure the UE with a relevant measurement configuration on the reported neighboring CSG cell when the measurement configuration is not present. In this situation, the corresponding handover request from the macro cell to CSG femto cell is performed.

If the UE is "leaving" a CSG where the CSG is on the whitelist of the corresponding UE, the network may configure the UE to stop measurements on the reported RAT and frequency.

If the UE is "entering" a CSG where the CSG is not on the whitelist of the corresponding UE, the network may configure the UE with a relevant measurement configuration on the reported neighboring CSG cell when the measurement configuration is not present. Furthermore, upon receiving the measurement report from the UE, an eICIC trigger message may be sent from the serving cell to the neighboring CSG femto cell for an eICIC request at the neighboring CSG cell. The eICIC/HO configuration procedure is shown in FIG. 6 for an embodiment where the underlying eICIC scheme is associated with power setting configuration.

Figure 6:
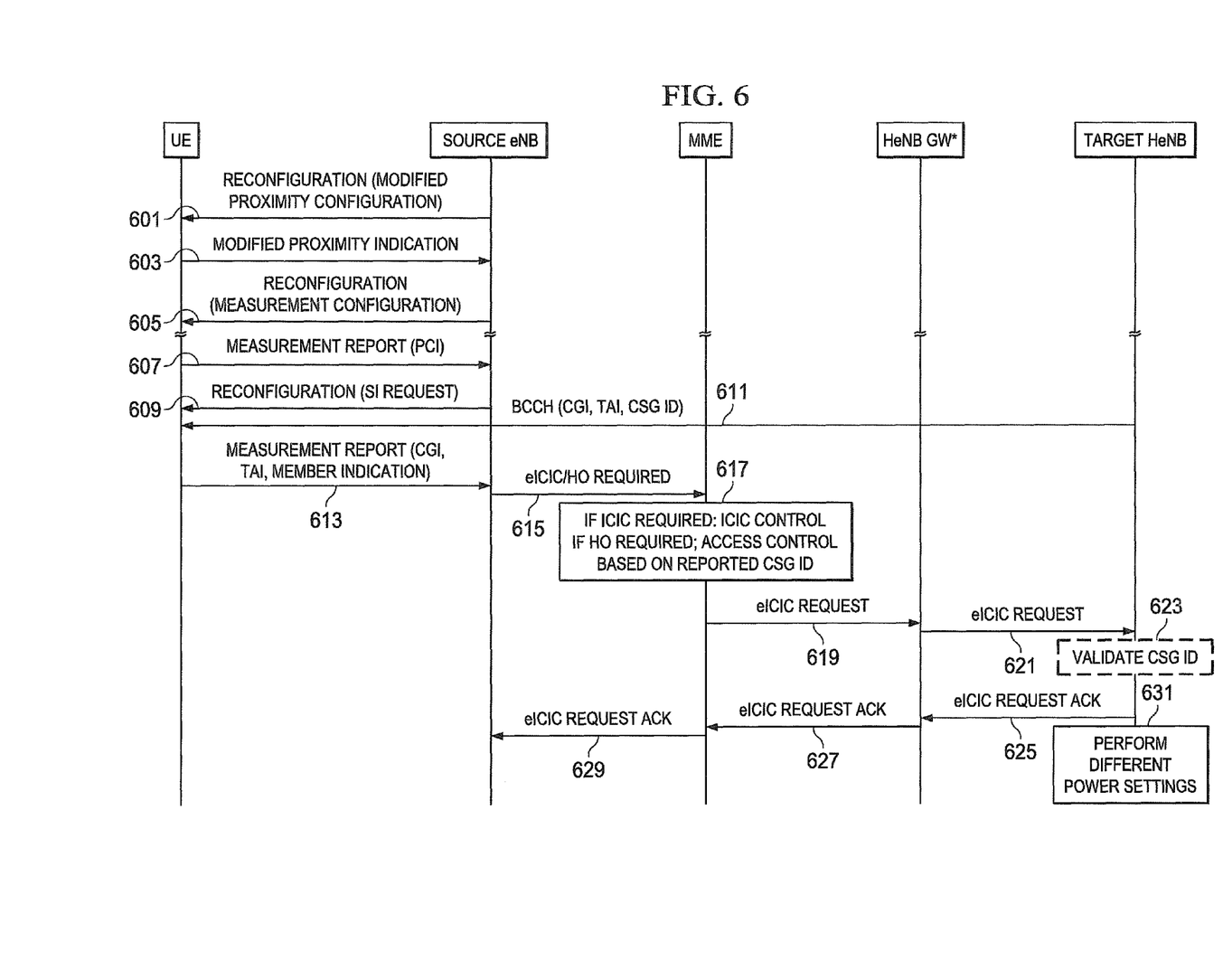
FIG. 6 illustrates a message flow diagram for a eICIC/handover (HO) configuration procedure, according to an embodiment of this disclosure.

FIG. 6 illustrates a message flow diagram for a eICIC/HO configuration procedure, according to an embodiment of this disclosure. In FIG. 6, the eICIC is associated with a power setting configuration. For the sake of illustration, FIG. 6 is also described with respect to the femto cell/macro cell HetNet interference embodiment described earlier. However, it will be understood that the procedure described in FIG. 6 could be used in other networks as well.

As shown in FIG. 6, operations 601 through 631 are the same as or substantially similar to the corresponding operations 401-431 in FIG. 4, except for the following differences. In operation 615, the source eNB sends a message to the MME that eICIC or handover or both are required. In operation 517, if eICIC is required, the MME coordinates ICIC control, which in FIG. 6 is associated with a power setting adjustment. If handover is required, the MME coordinates access control based on the reported CSG ID.

Figure 7:
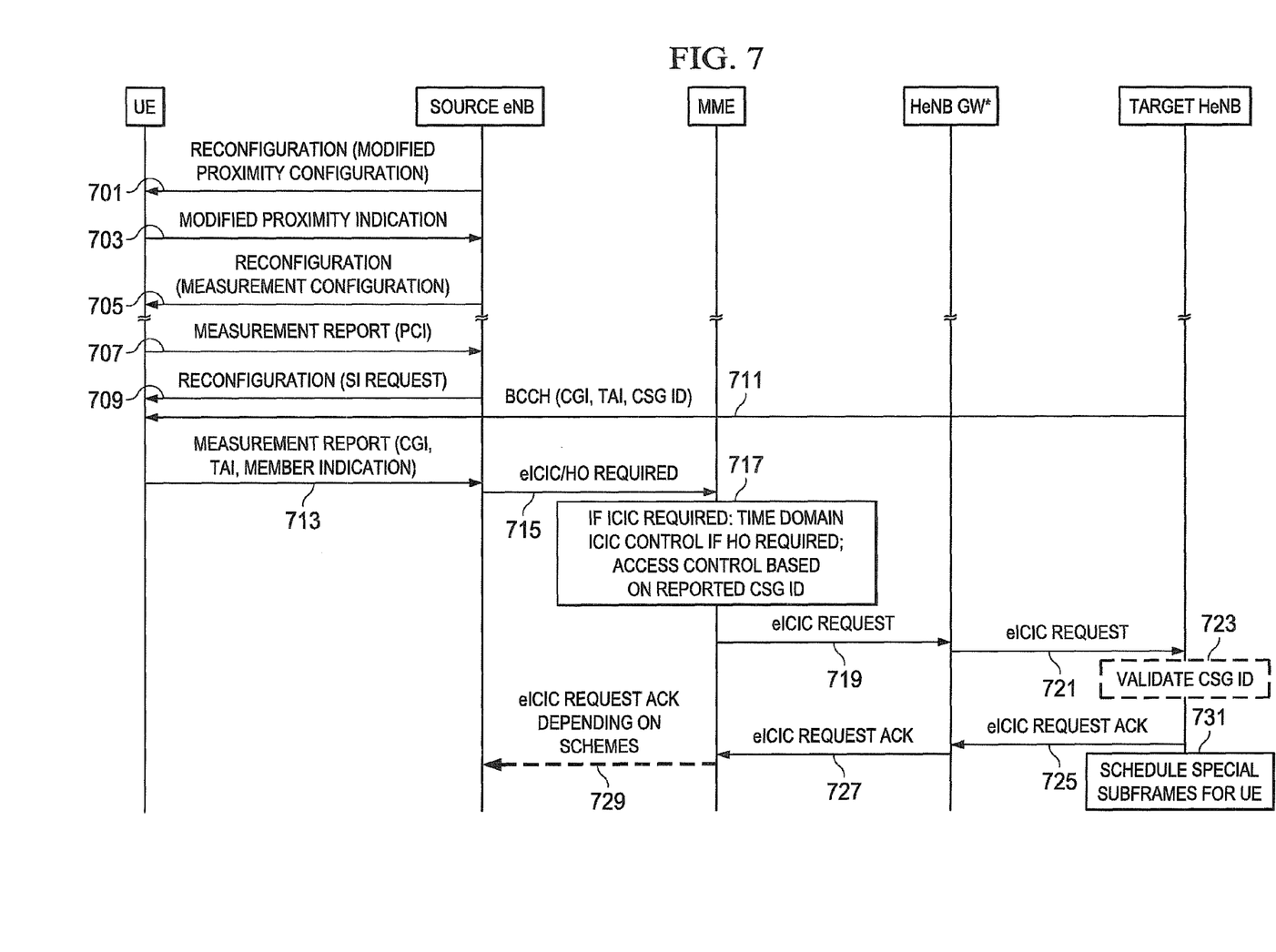
FIG. 7 illustrates a message flow diagram for a corresponding eICIC/HO configuration procedure, according to an embodiment of this disclosure.

FIG. 7 illustrates a message flow diagram for a corresponding eICIC/HO configuration procedure, according to an embodiment of this disclosure. In FIG. 7, the underlying eICIC scheme is a time domain solution, rather than the power setting scheme shown in FIG. 6. For the sake of illustration, FIG. 7 is also described with respect to the femto cell/macro cell HetNet interference embodiment described earlier. However, it will be understood that the procedure described in FIG. 7 could be used in other networks as well.

As shown in FIG. 7, operations 701 through 731 are the same as or substantially similar to the corresponding operations 601-631 in FIG. 6, except for the following differences. In operation 717, the MME coordinates time domain ICIC control, which may include configuring an ABSF pattern. In an alternative embodiment, the time domain ICIC control is coordinated at the HeNB gateway, instead of the MME. In operation 731, the HeNB schedules special subframes for the UE according to the ABSF pattern.

For eICIC triggering based on a time-domain solution, as shown in FIG. 7, the ABSF pattern to be used at the neighboring CSG femto cell may depend on both the eICIC request and the femto cell's own traffic conditions.

Figure 8:
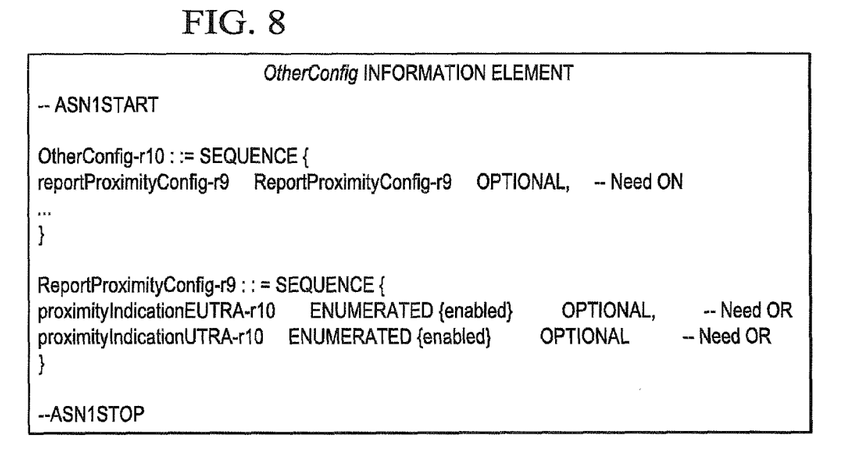
FIG. 8 illustrates an 'OtherConfig' information element in a RRCConnectionReconfiguration message, according to an embodiment of this disclosure.

FIG. 8 illustrates an 'OtherConfig' information element in a RRCConnectionReconfiguration message, according to an embodiment of this disclosure. As shown in FIG. 8, the OtherConfig information element includes a 'reportProximityConfig' field. The 'reportProximityConfig' field indicates, for each of the applicable RATS (EUTRA, UTRA), whether or not a proximity femto indication is enabled for CSG cells of the concerned RAT. Herein, enabling or disabling of the proximity femto indication includes enabling or disabling of the related functionality (e.g. autonomous search in connected mode).

In an embodiment, a trigger condition is added to the UE's proximity femto indication report. For example, the trigger condition can be one or more predefined events, e.g., the LTE measurement events A3, A4, and A5.

Figure 9:
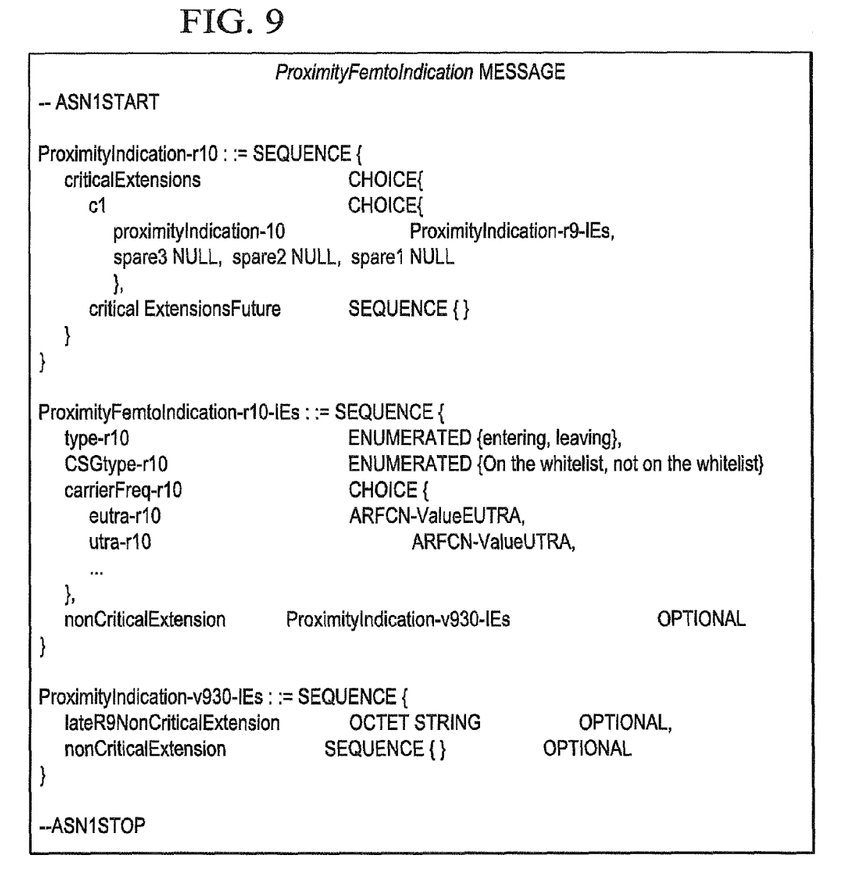
FIG. 9 illustrates a 'ProximityFemtoIndication' element in the UE's ProximityFemtoIndication message, according to an embodiment of this disclosure.

FIG. 9 illustrates a 'ProximityFemtoIndication' element in the UE's ProximityFemtoIndication message, according to an embodiment of this disclosure. As shown in FIG. 9, the 'ProximityFemtoIndication' element includes a 'type' field and a 'carrierFreq' field.

The 'type' field indicates whether the UE is entering or leaving the proximity of a cell (or cells), and whether the CSG ID of the cell(s) are not in the UEs CSG whitelist. The 'carrierFreq' field indicates the RAT and frequency of the cell(s) for which the proximity femto indication is sent.

In one embodiment, the proximity femto indication in Step 1 can be configured in several alternative configurations.

In a first alternative, one bit is added to the PFI. Accordingly, "S0" may represent IC reporting and "S1" may represent HO reporting. Or "S0" may represent IC and HO reporting, and "S1" may represent HO reporting.

In a second alternative, a two-bit bitmap for IC and HO is added to the PFI. Accordingly, "S11" may represent reporting for IC and HO, "S10" may represent reporting IC only, and "S01" may represent reporting HO only.

In a third alternative, one bit is added to the PFI with a trigger event for IC. The trigger for IC, for example, can be based on a predefined event.

In one embodiment of this disclosure, the network informs the macro UE about the ABSF configuration of the femto CSG cell in the RRC-IDLE mode. In a particular embodiment, the ABSF configuration information of femto CSG cells is contained in at least one of the following messages of femto cells:

Master Information Block (MIB) through the Physical Broadcast Channel (PBCH)
System Information Blocks (SIBs) through the Physical Downlink Shared Channel (PDSCH)

For macro cells, the ABSF configuration information is contained in at least one of the following messages of macro cell:

MIB through the PBCH
SIBs through the PDSCH

In embodiments where there is a fixed ABSF pattern for the femto cell (ABSF1) and one fixed ABSF pattern for the macro cell (for cell range expansion for Pico cell, ABSF2), two bits may be used to convey the ABSF patterns to the macro UE in the information blocks described above (either MIB or SIBs). The mapping of the two bits may be as shown in Table 2 below.

TABLE 2

Bitmap for ABSF Patterns

| [b1, b0] | Indication |
|---|---|
| [1, 0] | ABSF1 is applied in the femto CSGs within the coverage of macro cell |
| [0, 1] | ABSF2 is applied in the macro cell |
| [0, 0] | No ABSFs are applied in either macro cell or femto CSGs within the coverage of the macro cell |
| [1, 1] | ABSF2 is applied in the macro cell and ABSF1 is applied in the femto CSGs within the coverage of Macro |

After reception of the information, the UE performs cell search measurement based on the subframe that intersects with the non-ABSF of the macro cell and the ABSF of the femto CSG.

Turning now to a method for improving PUSCH CQI/PMI feedback, in LTE systems, channel estimation and demodulation are based on non-precoded common reference signals (CRS). Accordingly, the UE estimates the channel using the non-precoded reference signals and feeds back the suggested precoding vector and corresponding suggested modulation coding scheme (MCS) to the network. The UE determines the suggested precoding vector from a predetermined set of pre-coding vectors such that if it is applied at the network, the signal-to-interference plus noise ratio (SINR) at the UE will be maximized. The suggested precoding vector is therefore called a "precoding matrix index (PMI)" while the corresponding quantized SINR value is called a "channel quality index (CQI)".

In one embodiment of this disclosure, the UE feedback channel state information is conditioned on the corresponding single-user (SU-) multiple-input-multiple-output (MIMO) RI report. That is, the feedback content of PMI/CQI will be different depending on the value of the RI report. In 3GPP Release 8, the UE reports SU-MIMO PMI/CQI for different RI reports.

In 3GPP Release 10 and beyond, for example, the following feedback content for at least one of the PUSCH feedback modes is proposed:

When the SU-MIMO RI is 1:
A single precoding matrix is selected from the codebook subset assuming transmission on set S subbands.
The UE reports one subband CQI value for each set S subband which is calculated assuming the use of the single precoding matrix in all subbands and assuming transmission in the corresponding subband.
The UE reports a wideband CQI value which is calculated assuming the use of the single precoding matrix in all subbands and assuming transmission on set S subbands.
The UE reports the single selected precoding matrix indicator.
The UE reports one subband MU-CQI value for each set S subband which is calculated assuming the use of companion precoding matrices of the corresponding reported precoding matrix indicator in all subbands and assuming transmission in the corresponding subband.
The UE reports a wideband MU-CQI value which is calculated assuming the use of companion precoding matrices of the corresponding reported precoding matrix indicator in all subbands and assuming transmission on set S subbands.
Subband CQI values for each codeword are encoded differently with respect to their respective wideband CQI using two bits as defined by:

Subband differential CQI offset level=subband CQI index−wideband CQI index.

When the SU-MIMO RI is greater than 1:
A single precoding matrix is selected from the codebook subset assuming transmission on set S subbands.
The UE reports one subband CQI value per codeword for each set S subband which is calculated assuming the use of the single precoding matrix in all subbands and assuming transmission in the corresponding subband.
The UE reports a wideband CQI value per codeword which is calculated assuming the use of the single precoding matrix in all subbands and assuming transmission on set S subbands.
The UE reports the single selected precoding matrix indicator.
A single precoding matrix is selected from the rank 1 codebook subset assuming transmission on set S subbands.
The UE reports one subband MU-CQI value for each set S subband which is calculated assuming the use of companion precoding matrices of the corresponding rank-restricted precoding matrix indicator in all subbands and assuming transmission in the corresponding subband.
The UE reports a wideband MU-CQI value which is calculated assuming the use of companion precoding matrices of the corresponding rank-restricted precoding matrix indicator in all subbands and assuming transmission on set S subbands.
The UE reports the rank-restricted precoding matrix indicator.
Subband CQI values for each codeword are encoded differently with respect to their respective wideband CQI using two bits as defined by:

Subband differential CQI offset level=subband CQI index−wideband CQI index.

For calculating MU-CQI of a precoding matrix, companion precoding matrices of the corresponding precoding matrix are assumed to be used at the network. Furthermore, the companion precoding matrices of the corresponding precoding matrix are fixed and predetermined for each precoding matrix.

In 3GPP Release 10 and beyond, for example, the following feedback content for at least one of the PUSCH feedback modes is proposed:

When the SU-MIMO RI is less than 3:
A single precoding matrix is selected from the codebook subset assuming transmission on set S subbands.
The UE reports one subband CQI value per codeword for each set S subband which is calculated assuming the use of the single precoding matrix in all subbands and assuming transmission in the corresponding subband.
The UE reports a wideband CQI value per codeword which is calculated assuming the use of the single precoding matrix in all subbands and assuming transmission on set S subbands.
The UE reports the single selected precoding matrix indicator.
The UE reports one subband MU-CQI value per codeword for each set S subband which is calculated assuming the use of companion precoding matrices of the corresponding reported precoding matrix indicator in all subbands and assuming transmission in the corresponding subband.
The UE reports a wideband MU-CQI value per codeword which is calculated assuming the use of companion precoding matrices of the corresponding reported precoding matrix indicator in all subbands and assuming transmission on set S subbands.
Subband CQI values for each codeword are encoded differently with respect to their respective wideband CQI using two bits as defined by:

Subband differential CQI offset level=subband CQI index−wideband CQI index.

When the SU-MIMO RI is greater than 2:
A single precoding matrix is selected from the codebook subset assuming transmission on set S subbands.
The UE reports one subband CQI value per codeword for each set S subband which is calculated assuming the use of the single precoding matrix in all subbands and assuming transmission in the corresponding subband.
The UE reports a wideband CQI value per codeword which is calculated assuming the use of the single precoding matrix in all subbands and assuming transmission on set S subbands.
The UE reports the single selected precoding matrix indicator.

A single precoding matrix is selected from the rank 2 codebook subset assuming transmission on set S subbands.

The UE reports one subband MU-CQI value per codeword for each set S subband which is calculated assuming the use of companion precoding matrices of the corresponding rank-restricted precoding matrix indicator in all subbands and assuming transmission in the corresponding subband.

The UE reports a wideband MU-CQI value which is calculated assuming the use of companion precoding matrices of the corresponding rank-restricted precoding matrix indicator in all subbands and assuming transmission on set S subbands.

The UE reports the rank-restricted precoding matrix indicator.

Subband CQI values for each codeword are encoded differently with respect to their respective wideband CQI using two bits as defined by:

Subband differential CQI offset level=subband CQI index−wideband CQI index.

In 3GPP Release 10 and beyond, for example, the following feedback content for at least one of the PUSCH feedback modes is proposed:

When the SU-MIMO RI is 1:

A single precoding matrix is selected from the codebook subset assuming transmission on set S subbands.

The UE reports one subband CQI value for each set S subband which is calculated assuming the use of the single precoding matrix in all subbands and assuming transmission in the corresponding subband.

The UE reports a wideband CQI value which is calculated assuming the use of the single precoding matrix in all subbands and assuming transmission on set S subbands.

The UE reports the single selected precoding matrix indicator.

Subband CQI values for each codeword are encoded differently with respect to their respective wideband CQI using two bits as defined by:

Subband differential CQI offset level=subband CQI index−wideband CQI index.

When the SU-MIMO RI is greater than 1:

A single precoding matrix is selected from the codebook subset assuming transmission on set S subbands.

The UE reports one subband CQI value per codeword for each set S subband which is calculated assuming the use of the single precoding matrix in all subbands and assuming transmission in the corresponding subband.

The UE reports a wideband CQI value per codeword which is calculated assuming the use of the single precoding matrix in all subbands and assuming transmission on set S subbands.

The UE reports the single selected precoding matrix indicator.

A single precoding matrix is selected from the rank 1 codebook subset assuming transmission on set S subbands.

The UE reports one subband CQI value for each set S subband which is calculated assuming the use of the rank-restricted precoding matrix indicator in all subbands and assuming transmission in the corresponding subband.

The UE reports a wideband CQI value which is calculated assuming the use of the rank-restricted precoding matrix indicator in all subbands and assuming transmission on set S subbands.

The UE reports the rank-restricted precoding matrix indicator.

Subband CQI values for each codeword are encoded differently with respect to their respective wideband CQI using two bits as defined by:

Subband differential CQI offset level=subband CQI index−wideband CQI index.

In 3GPP Release 10 and beyond, for example, the following feedback content for at least one of the PUSCH feedback modes is proposed:

When the SU-MIMO RI is less than 3:

A single precoding matrix is selected from the codebook subset assuming transmission on set S subbands.

The UE reports one subband CQI value per codeword for each set S subband which is calculated assuming the use of the single precoding matrix in all subbands and assuming transmission in the corresponding subband.

The UE reports a wideband CQI value per codeword which is calculated assuming the use of the single precoding matrix in all subbands and assuming transmission on set S subbands.

The UE reports the single selected precoding matrix indicator.

Subband CQI values for each codeword are encoded differently with respect to their respective wideband CQI using two bits as defined by:

Subband differential CQI offset level=subband CQI index−wideband CQI index.

When the SU-MIMO RI is greater than 2:

A single precoding matrix is selected from the codebook subset assuming transmission on set S subbands.

The UE reports one subband CQI value per codeword for each set S subband which is calculated assuming the use of the single precoding matrix in all subbands and assuming transmission in the corresponding subband.

The UE reports a wideband CQI value per codeword which is calculated assuming the use of the single precoding matrix in all subbands and assuming transmission on set S subbands.

The UE reports the single selected precoding matrix indicator.

A single precoding matrix is selected from the rank 2 codebook subset assuming transmission on set S subbands.

The UE reports one subband CQI value for each set S subband which is calculated assuming the use of the rank-restricted precoding matrix indicator in all subbands and assuming transmission in the corresponding subband.

The UE reports a wideband CQI value which is calculated assuming the use of the rank-restricted precoding matrix indicator in all subbands and assuming transmission on set S subbands.

The UE reports the rank-restricted precoding matrix indicator.

Subband CQI values for each codeword are encoded differently with respect to their respective wideband CQI using two bits as defined by:

Subband differential CQI offset level=subband CQI index−wideband CQI index.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a heterogeneous network, a method for enabling interference coordination, the method comprising:
upon occurrence of a trigger condition, determining, at a first low power node, that the first low power node is approaching a second low power node;
sending, at the first low power node, an entering message to an evolved Node-B (eNB) that serves the first low power node; and
receiving, at the first low power node, configuration information from the eNB to perform at least one measurement of the second low power node.

2. The method of claim 1, further comprising:
receiving, at the second low power node, a request to perform an Inter-Cell Interference Coordination (ICIC) process, the ICIC process comprising one of: a power setting adjustment and a time domain process associated with almost blank subframes (ABSFs).

3. The method of claim 1, wherein when an Inter-Cell Interference Coordination (ICIC) process has been established between the eNB and the second low power node, the trigger condition is based on at least one of: a reference signal receive power (RSRP) of the second low power node's almost blank subframes (ABSFs), a reference signal receive quality (RSRQ) of the second low power node's ABSFs, the RSRP of the second low power node's non-ABSFs, and the RSRQ of the second low power node's non-ABSFs.

4. The method of claim 1, wherein when an Inter-Cell Interference Coordination (ICIC) process has not been established between the eNB and the second low power node, the trigger condition is based on at least one of: a reference signal receive power (RSRP) of the second low power node, a reference signal receive quality (RSRQ) of the second low power node, and a predefined LTE measurement event.

5. The method of claim 1, wherein the at least one measurement is associated with at least one of: radio link monitoring (RLM), radio resource management (RRM), and channel state information (CSI) measurement on restricted resources.

6. The method of claim 1, wherein the first low power node is a user equipment (UE) communicating in a macro network and the second low power node is a femto eNB.

7. The method of claim 1, wherein the entering message is one of a proximity femto indication (PFI) message and strong macro interference indication (SMI) message.

8. For use in a heterogeneous network, a first low power node capable of interference coordination, the first low power node configured to:
upon occurrence of a trigger condition, determine that the first low power node is approaching a second low power node;
send an entering message to an evolved Node-B (eNB) that serves the first low power node; and
receive configuration information from the eNB to perform at least one measurement of the second low power node.

9. The first low power node of claim 8, wherein the second low power node receives a request to perform an Inter-Cell Interference Coordination (ICIC) process, the ICIC process comprising one of: a power setting adjustment and a time domain process associated with almost blank subframes (ABSFs).

10. The first low power node of claim 8, wherein when an Inter-Cell Interference Coordination (ICIC) process has been established between the eNB and the second low power node, the trigger condition is based on at least one of: a reference signal receive power (RSRP) of the second low power node's almost blank subframes (ABSFs), a reference signal receive quality (RSRQ) of the second low power node's ABSFs, the RSRP of the second low power node's non-ABSFs, and the RSRQ of the second low power node's non-ABSFs.

11. The first low power node of claim 8, wherein when an Inter-Cell Interference Coordination (ICIC) process has not been established between the eNB and the second low power node, the trigger condition is based on at least one of: a reference signal receive power (RSRP) of the second low power node, a reference signal receive quality (RSRQ) of the second low power node, and a predefined LTE measurement event.

12. The first low power node of claim 8, wherein the at least one measurement is associated with at least one of: radio link monitoring (RLM), radio resource management (RRM), and channel state information (CSI) measurement on restricted resources.

13. The first low power node of claim 8, wherein the first low power node is a user equipment (UE) communicating in a macro network and the second low power node is a femto eNB.

14. The first low power node of claim 8, wherein the entering message is one of a proximity femto indication (PFI) message and strong macro interference indication (SMI) message.

15. A heterogeneous network configured for interference coordination, the heterogeneous network comprising:
a first low power node;
a second low power node; and
an evolved Node-B (eNB) that serves the first low power node,
wherein the first low power node is configured to:
upon occurrence of a trigger condition, determine that the first low power node is approaching the second low power node;
send an entering message to the evolved Node-B (eNB); and
receive configuration information from the eNB to perform at least one measurement of the second low power node.

16. The heterogeneous network of claim 15, wherein the second low power node receives a request to perform an Inter-Cell Interference Coordination (ICIC) process, the ICIC process comprising one of: a power setting adjustment and a time domain process associated with almost blank subframes (ABSFs).

17. The heterogeneous network of claim 15, wherein when an Inter-Cell Interference Coordination (ICIC) process has been established between the eNB and the second low power node, the trigger condition is based on at least one of: a reference signal receive power (RSRP) of the second low power node's almost blank subframes (ABSFs), a reference signal receive quality (RSRQ) of the second low power node's ABSFs, the RSRP of the second low power node's non-ABSFs, and the RSRQ of the second low power node's non-ABSFs.

18. The heterogeneous network of claim 15, wherein when an Inter-Cell Interference Coordination (ICIC) process has not been established between the eNB and the second low power node, the trigger condition is based on at least one of: a reference signal receive power (RSRP) of the second low power node, a reference signal receive quality (RSRQ) of the second low power node, and a predefined LTE measurement event.

19. The heterogeneous network of claim 15, wherein the at least one measurement is associated with at least one of: radio link monitoring (RLM), radio resource management (RRM), and channel state information (CSI) measurement on restricted resources.

20. The heterogeneous network of claim 15, wherein the first low power node is a user equipment (UE) communicating in a macro network and the second low power node is a femto eNB.

21. The heterogeneous network of claim 15, wherein the entering message is one of a proximity femto indication (PFI) message and strong macro interference indication (SMI) message.

* * * * *